US010053234B2

(12) United States Patent
Durnad et al.

(10) Patent No.: US 10,053,234 B2
(45) Date of Patent: Aug. 21, 2018

(54) DEVICE POSITIONING TWO AIRCRAFT PIECES RELATIVE TO ONE ANOTHER, SUCH AS A CROSSBEAM AND A FUSELAGE FRAME

(71) Applicant: Airbus Operations (SAS), Toulouse (FR)

(72) Inventors: Yves Durnad, Aussonne (FR); Bernard Guering, Montrabe (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 219 days.

(21) Appl. No.: 14/637,770

(22) Filed: Mar. 4, 2015

(65) Prior Publication Data

US 2015/0251775 A1  Sep. 10, 2015

(30) Foreign Application Priority Data

Mar. 7, 2014  (FR) ..................... 14 51861

(51) Int. Cl.
| | | |
|---|---|---|
| *B64F 5/10* | (2017.01) | |
| *B64C 1/18* | (2006.01) | |
| *B64F 5/00* | (2017.01) | |
| *B64C 1/06* | (2006.01) | |

(52) U.S. Cl.
CPC ............ *B64F 5/0009* (2013.01); *B64C 1/061* (2013.01); *B64C 1/18* (2013.01); *B64F 5/10* (2017.01); *Y10T 29/49622* (2015.01)

(58) Field of Classification Search
CPC ........ B64F 5/0009; B64F 5/10; B64F 5/0036; B64F 5/50; B64C 1/061; B64C 1/18; Y10T 29/10; B23P 19/10
See application file for complete search history.

(56) References Cited

U.S. PATENT DOCUMENTS

| | | | | |
|---|---|---|---|---|
| 9,199,715 | B2* | 12/2015 | Koncz | .................... B64F 5/0009 |
| 2007/0226981 | A1* | 10/2007 | Craig | ..................... B23P 19/10 |
| | | | | 29/243.53 |
| 2010/0050416 | A1* | 3/2010 | Renke | ..................... F16B 21/09 |
| | | | | 29/468 |

(Continued)

FOREIGN PATENT DOCUMENTS

| | | |
|---|---|---|
| CN | 201634342 U | 11/2010 |
| CN | 103407910 A | 11/2013 |

(Continued)

OTHER PUBLICATIONS

French Search Report, dated Oct. 31, 2014.
Chinese Office Action for Application No. 201510278004.0 dated Apr. 25, 2018.

*Primary Examiner* — Richard R Green

(74) *Attorney, Agent, or Firm* — Greer, Burns & Crain, Ltd.

(57) ABSTRACT

A device for positioning a first piece relative to a second piece. The first piece comprises a free end with a first bore and the second piece comprises an engagement part with a second bore intended to come into correspondence with the first bore. The first and second bore are drilled to the definitive diameter thereof prior to the relative positioning thereof. The device comprises one or more positioning elements, which are able to position the first bore relative to the second bore along at least one of three geometric axes.

19 Claims, 7 Drawing Sheets

(56) References Cited

U.S. PATENT DOCUMENTS

| | | |
|---|---|---|
| 2010/0230544 A1 | 9/2010 | Huber et al. |
| 2011/0036946 A1* | 2/2011 | Depeige .................... B64C 1/18 244/120 |
| 2013/0185918 A1 | 7/2013 | Yamane et al. |
| 2014/0208592 A1* | 7/2014 | Wright .................. B64F 5/0009 29/897.2 |
| 2016/0214199 A1* | 7/2016 | Benzing ................. B23K 26/08 |

FOREIGN PATENT DOCUMENTS

| | | |
|---|---|---|
| DE | 102005045181 | 4/2007 |
| EP | 2228298 | 9/2010 |
| GB | 1454223 | 11/1976 |
| WO | WO2007033640 A1 | 3/2007 |
| WO | 2012141004 | 10/2012 |

\* cited by examiner

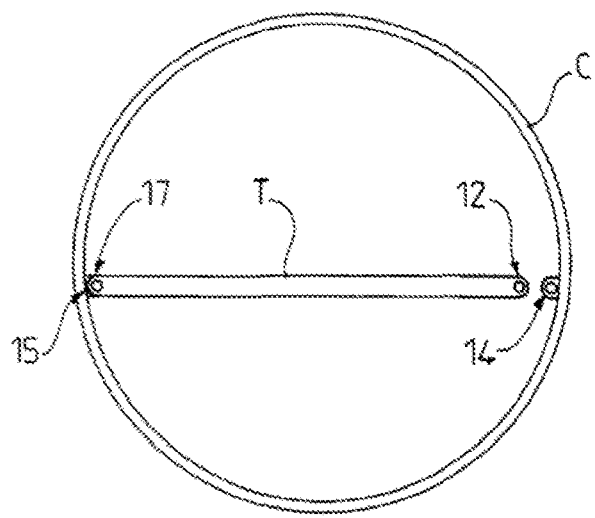
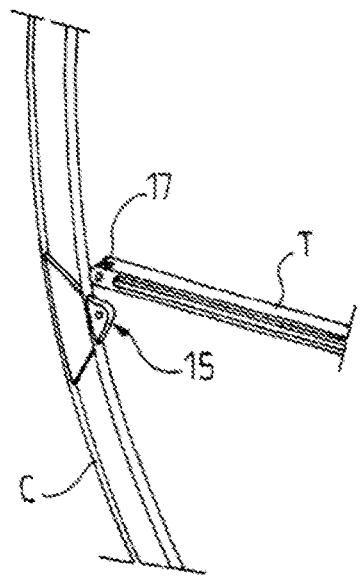
FIG.3
FIG.4
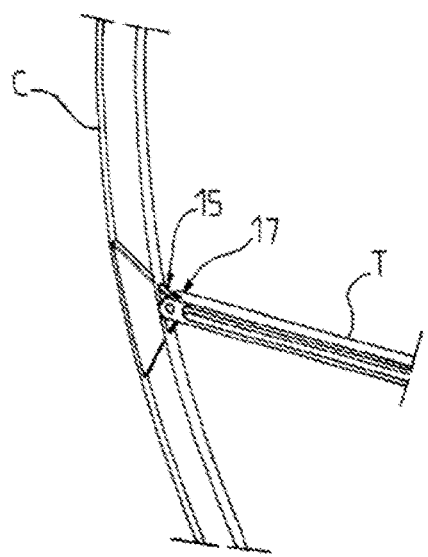
FIG.5

DEVICE POSITIONING TWO AIRCRAFT PIECES RELATIVE TO ONE ANOTHER, SUCH AS A CROSSBEAM AND A FUSELAGE FRAME

CROSS-REFERENCES TO RELATED APPLICATIONS

This application claims the benefit of the French patent application No. 1451861 filed on Mar. 7, 2014, the entire disclosures of which are incorporated herein by way of reference.

FIELD OF THE INVENTION

The invention relates to an assembly comprising a first aircraft piece and a second aircraft piece as well as a device for positioning the first piece relative to the second piece.

BACKGROUND OF THE INVENTION

In the aeronautical sector crossbeams (the crossbeams constitute the structural part of a floor of the aircraft) must be assembled to frames, which constitute the primary structure of the fuselage, in a precise manner. Each crossbeam, which is generally of great length (several meters), is brought into correspondence, by means of the two opposite ends thereof, with two opposite points respectively of the inner periphery of each frame. The opposite ends of the crossbeam and the respective fixing points of the frame, which are generally pre-drilled before they are placed in correspondence, are then drilled definitively and are assembled in situ.

When pieces of equipment, some of which are sensitive (because they integrate electronic components and electrical elements), have already been brought inside the primary fuselage structure, the drilling operations that are performed subsequently generate shavings and dust, which have the potential to pollute these pieces of equipment.

It would therefore be useful to overcome this problem.

SUMMARY OF THE INVENTION

The present invention thus relates, in accordance with one aspect, to an assembly comprising a first aircraft piece (T) and a second aircraft piece (C) and a device for positioning the first piece relative to the second piece, the first piece comprising a free end provided with at least one first bore (a1, a2) and the second piece comprising an engagement part provided with at least one second bore (a3) intended to come into correspondence with said at least one first bore, characterized in that the device comprises at least one mechanical positioning element serving as a geometric reference in the event of a relative displacement of said at least one first and second bores drilled to the definitive diameters thereof in order to position, along at least one of a first, a second and a third geometric axis, said at least one first bore relative to said at least one second bore. Because the bores have been drilled beforehand to the definitive diameter thereof, they no longer require any additional drilling. This simplifies the subsequent operations that may take place in an environment in which it is preferable not to create any pollution and which is additionally crowded. A precise positioning of the bores relative to one another is then necessary since the pieces are already at the final assembly dimensions. The bores are positioned along at least one geometric axis, in a simple manner, thanks to said at least one mechanical positioning element, which serves as a geometric reference in the event of the displacement of one piece relative to the other in order to bring into correspondence (for example: center) the bores along said at least one geometric axis. In certain circumstances this may allow the positioning along two or all three geometric axes simultaneously or quasi simultaneously.

In accordance with other possible features taken in isolation or in combination with one another:
said at least one positioning element is connected permanently or temporarily to one of the first and second pieces;
said at least one positioning element is not involved in the functions of the first and second pieces;
said at least one positioning element is not arranged opposite or inside said at least one first and second bores;
the first geometric axis is parallel to the axis of said at least first and second bores;
said at least one positioning element comprises an element for centering the first piece relative to the second piece along the first axis;
the centering element is arranged above the engagement part of the second piece;
the centering element is a shoe, which for example is removable, of which the upper portion forms a wedge;
said at least one positioning element comprises an element for centering said at least one first bore relative to said at least one second bore along the second geometric axis (Z);
the centering element is arranged below the engagement part of the second piece;
the centering element is a chock, which for example is removable;
the assembly comprises a tool for positioning the first piece relative to the second piece;
the positioning tool comprises first gripping members, which are able to be locked on one of the pieces, and second gripping members, which are able to be locked on the other piece, said first gripping members being displaceable relative to said second gripping members along said at least one geometric axis.
the tool comprises a head provided with first and second gripping members and means for driving a movement of said first gripping members relative to said second gripping members along said at least one geometric axis.
said at least one positioning element comprises a plurality of elements serving as geometric references arranged on the first piece and on the second piece and which are intended to be aligned with one another along the second geometric axis (Z) and/or the third geometric axis (Y);
said at least one tool is able to bring the geometric reference or references of one piece into alignment with the geometric reference or references of the other piece along the second geometric axis (Z) and/or the third geometric axis;
said at least one element for positioning said at least one first bore relative to said at least one second bore along the first geometric axis or the second geometric axis is arranged on at least one of the two pieces;
the positioning device further comprises:
at least one active member arranged on one piece, at least one passive member arranged on the other piece and which is able to cooperate with said at least one active member by transmission and reception of electromagnetic waves, a closed-loop control system, which is able to control the electromagnetic waves transmitted and the displacement of at least one piece relative to the other depending on the waves received by said at least one passive member so as to bring into geometric correspondence said at least one active and passive member;

the positioning device comprises a plurality of elements serving as geometric references arranged on the first piece and on the second piece and which are intended to be aligned with one another along the first geometric axis (X) and/or the second geometric axis (Z) and/or the third geometric axis (Y).

the first and the third geometric axis are arranged in the horizontal plane, and the second geometric axis is the vertical axis;

the first piece is a crossbeam and the second piece is a frame;

the crossbeam is intended to be fixed at two diametrically opposed points of the inner periphery of the frame by means respectively of the two opposite ends of said crossbeam, of which one is the free, as yet unfixed end of the crossbeam and the other is the opposite end already fixed at a point of the frame;

the device comprises means for compressing the frame, which are able to exert a compressive force on the frame so as to bring toward one another the two diametrically opposed points of the inner periphery of the frame;

the free end of the crossbeam comprises a clevis aligned in the longitudinal axis of the crossbeam, and the engagement part forms a tenon arranged on the inner periphery of the frame.

The invention also relates, in accordance with another aspect, to an aircraft, characterized in that it comprises at least one assembly as presented briefly above.

In accordance with yet a further aspect, the invention relates to a method for positioning a first aircraft piece (T) relative to a second aircraft piece (C), the first piece comprising a free end provided with at least one first bore (a1, a2) and the second piece comprising a first engagement part provided with at least one second bore (a3) intended to come into correspondence with said at least one first bore, characterized in that said at least one first bore and said at least one second bore are drilled to the definitive diameter thereof prior to the relative positioning thereof, the method comprising a step of relative displacement of said at least one first and second bores and of positioning, along at least one of three geometric axes, of said at least one first bore relative to said at least one second bore by means of at least one mechanical positioning element, which serves as a geometric reference between said at least one first and second bores in the event of the relative displacement.

The method may also comprise at least some of the possible features presented above in relation with the positioning assembly.

BRIEF DESCRIPTION OF THE DRAWINGS

Further features and advantages will emerge from the following description, given merely by way of non-limiting example and provided with reference to the accompanying drawings, in which:

FIGS. 3 to 5 illustrate the mounting of a free end of a crossbeam on a fuselage frame;

DETAILED DESCRIPTION OF THE PREFERRED EMBODIMENTS

The present invention can be applied, in particular in the aeronautical field, for the positioning of a first piece, such as an aircraft crossbeam (intended to form, jointly with other crossbeams, the structural part of a floor of an aircraft), relative to a second fixed piece, such as a frame of a primary aircraft fuselage structure, referred to hereinafter as a fuselage frame.

Figure 1:
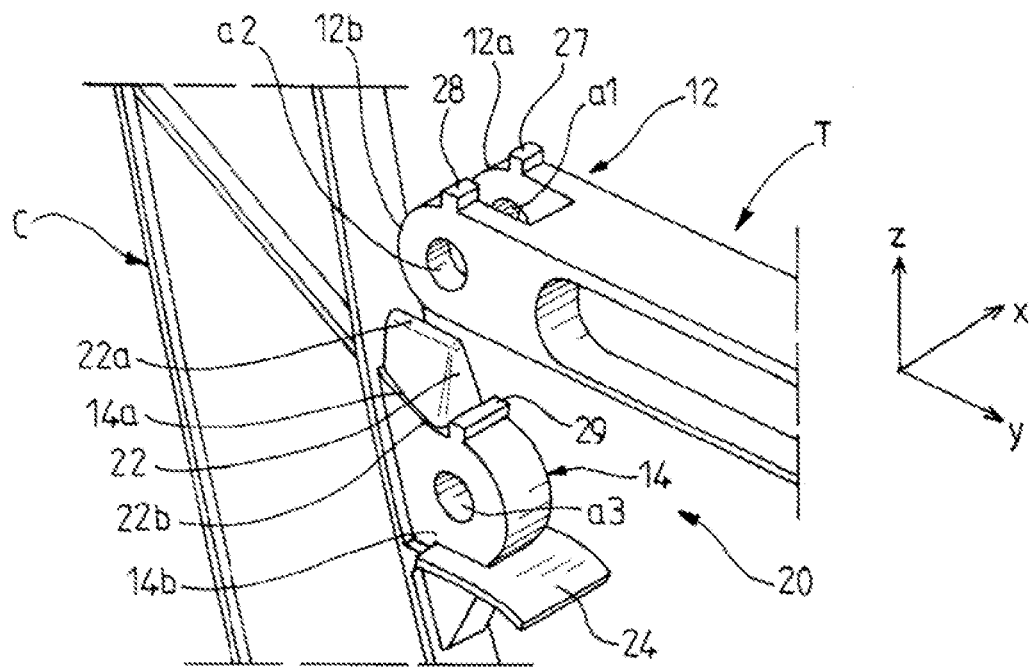
FIG. 1 is a general perspective view of an assembly in accordance with one embodiment of the invention.

FIG. 1 illustrates in an enlarged and partial manner:

a crossbeam T, which comprises a free and 12 provided with at least one first bore, a fuselage frame C, which comprises an engagement or fixing part 14 provided with at least one second bore.

The free end 12 of the crossbeam (similarly to the opposite end thereof not visible in FIG. 1) is configured in the form of a clevis aligned in the longitudinal direction of extension of the crossbeam. The free end 12 of the crossbeam comprises a bore which is drilled in each of the two parallel arms 12a, 12b of the clevis. The two first bores a1, a2 are aligned along a single axis which is perpendicular to the longitudinal direction of extension of the crossbeam T.

The engagement part 14 is formed on the inner peripheral edge of the frame C and is configured in the form of a tenon which extends radially toward the interior of the frame. The tenon 14 is drilled with a second bore a3 perpendicular to the plane in which the frame C extends.

The bores a1, a2, a3 are drilled in the pieces before these pieces are placed in the primary fuselage structure. These bores already have the definitive diameter required for the subsequent assembly of the pieces and therefore do not require any additional drilling or correction operation.

The positioning of the pieces of which the dimensions are definitive must therefore be precise so that these pieces can be assembled. This task is all the more complicated/delicate because the crossbeams are long pieces.

In the position illustrated in FIG. 1, the free end 12 of the crossbeam is arranged in the proximity of the engagement part 14 of the frame, thereabove, for the purpose of the relative positioning of the pieces.

A device 20 for positioning the crossbeam T relative to the frame C is used in order to place the two first bores a1 and a2 in geometric correspondence (alignment) with the second bore a3 in a very precise manner (within a few tenths of millimeters).

The positioning device 20 ensures the relative positioning along three geometric axes, more specifically a first geometric axis X (horizontal axis), a second geometric axis Z (vertical axis) and a third geometric axis Y (horizontal axis). The axes Z and Y are contained in the plane of the frame and are perpendicular to the axes of the bores a1, a2 and a3, whereas the axis X is parallel to said axes of the bores.

The device 20 comprises:
a first element 22 for positioning the two first bores a1, a2 relative to the second bore a3 along the first geometric axis X;
means 24, 27, 28, 29 for positioning the two first bores a1, a2 relative to the second bore a3 along the second axis (Z) and the third geometric axis (Y).

The first positioning element 22 has the task of ensuring the centering of the crossbeam, and therefore of the two first bores a1, a2, relative to the frame, and therefore relative to the second bore a3.

The first element 22 is formed, for example removably, above the tenon 14 so as to come into contact in a preferred manner with the free end 12 of the crossbeam, which is generally guided from above.

The first centering element 22 is, for example, a connected piece (for example a shoe) having the form of a wedge 22a in the upper portion thereof, which is intended to cooperate with the free end of the crossbeam. The lower portion 22b or base of the shoe 22 is enlarged so as to have a better seat on the upper portion 14a of the tenon 14.

The shoe 22 is, for example, glued to the tenon 14.

The aforementioned positioning means more particularly comprise a second positioning element 24, which is able to position/center the two first bores a1, a2 (already positioning along the first axis X) relative to the second bore a3 along the second axis Z.

This second positioning element 24 is arranged, for example removably, below the tenon 14 so as to serve as a vertical stop to the free end 12 of the crossbeam.

The second element 24 is, for example, a chock, which is mounted in the portion 14b of the tenon situated below the bore a3. The chock has, for example, a U shape, of which the opening engages with the aforementioned lower portion 14b of the tenon, and the two branches of the U thus flank this portion.

The positioning means also comprise a plurality of geometric references arranged partly on the free end 12 and partly on the tenon 14. These geometric references are intended to be aligned with one another along the third axis Y as soon as the first bores a1 and a2 and the third bore a3 have been positioned relative to one another along the first axis X and the second axis Z. The alignment of the geometric references with the third axis Y ensures the relative positioning/centering of the bores a1, a2, a3 along this axis.

The geometric references for example assume the form of lugs, of which two 27, 28 are formed respectively on the upper face of each of the two arms 12a, 12b of the free end (on either side of the cutout formed between these arms), vertically above the central axis of the bores a1 and a2.

A third lug 29 is formed on the upper portion of the tenon, vertically above the central axis of the bore a3. The shoe 22 is positioned set back relative to the lug 29, between said lug and the inner peripheral edge of the frame against which said shoe abuts.

Figure 2:
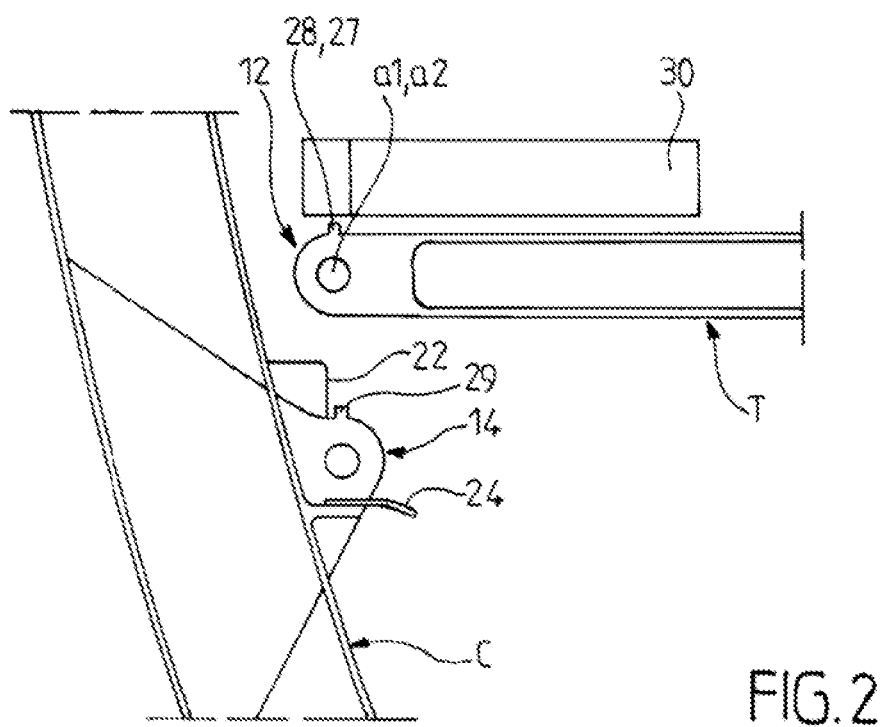
FIG. 2 is a side view of the assembly of FIG. 1.

As illustrated in FIG. 2, the positioning device also comprises a positioning tool 30, which is positioned above the free end 12 of the crossbeam. This tool is able, on command, to bring the geometric references 28, 27 and 29 into geometric correspondence or into alignment along the third axis Y.

The tool 30 is, for example, a clamp for readjusting the lugs, which may be of the hydraulic, electric or manual type depending on the value of the readjustment force to be exerted.

The tool is also provided, optionally, with a force limiter in order to secure the pieces.

A method for positioning the crossbeam T relative to the frame C and the assembly therewith will now be described with reference to FIGS. 3 to 15.

As shown in FIG. 3 (cross section of a primary aircraft fuselage structure), the crossbeam T is first fixed to an engagement or fixing part 15 of the frame C (identical to the engagement part 14). For this, the free end 17 in the form of a clevis of the crossbeam (identical to the end 12) is brought from above (FIG. 4) and is lowered to introduce the protruding part 15 of the frame into the cutout formed between the spaced arms of the clevis 17.

Once positioned (FIG. 5), the free end 17 and the part 15 are assembled by bolting in the bores, which are in correspondence, of the two pieces. FIG. 3 illustrates the crossbeam T fixed at a single one 17 of its ends, whereas the other opposite free end 12 is waiting to be positioned and assembled with the part 14 of the frame. The distance between the end 12 and the part 14 of the frame has been voluntarily exaggerated for the purposes of the illustration. In practice, the offset is approximately a few millimeters.

The positioning of the free end 12 of the crossbeam relative to the engagement part 14 of the frame requires the positioning device 20 described with reference to FIGS. 1 and 2.

Figure 6:
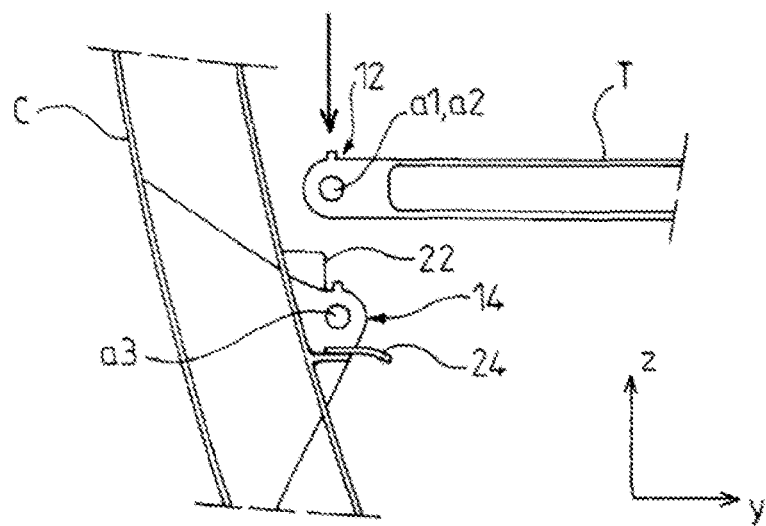
FIGS. 6 to 8 illustrate the positioning of the free end opposite the crossbeam of FIGS. 3 to 5 relative to the frame, along a first geometric axis X, in accordance with one embodiment.
Figure 7:
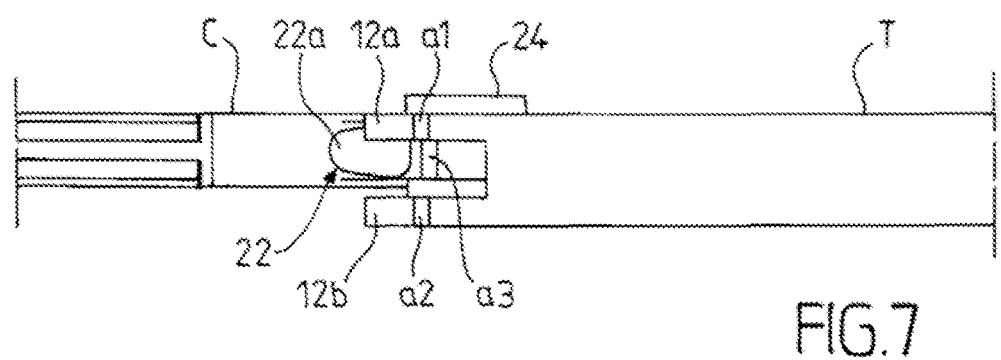
Figure 8:
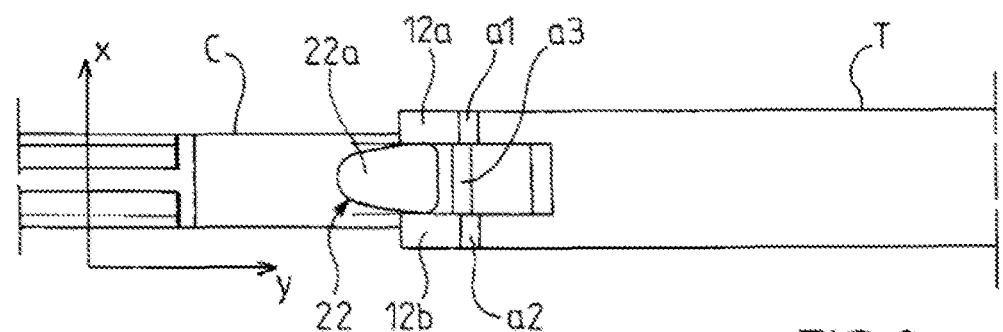

FIGS. 6 to 8 illustrate successively the positioning of the free end 12 (clevis) relative to the engagement part 14 (tenon) along the first geometric axis X.

The free end 12 is brought above the engagement part 14 and is lowered vertically (manually or with a lifting/lowering apparatus) such that the clevis comes into contact with the first positioning element 22. As illustrated in FIG. 7, one of the two arms 12a, 12b of the clevis touches one of the sloping edges of the upper wedge 22a of the shoe and slides thereover as the crossbeam descends. This causes the two arms 12a, 12b of the clevis to be positioned on either side of the shoe, thus centering said clevis on the shoe (FIG. 8).

The first bores a1 and a2 are thus positioned relative to the second bore a3 along the first axis X.

In FIGS. 7 and 8 the positioning error of the bores along the third axis Y is evident (the positioning error along the second axis Z is also present, but is not visible).

Figure 9:
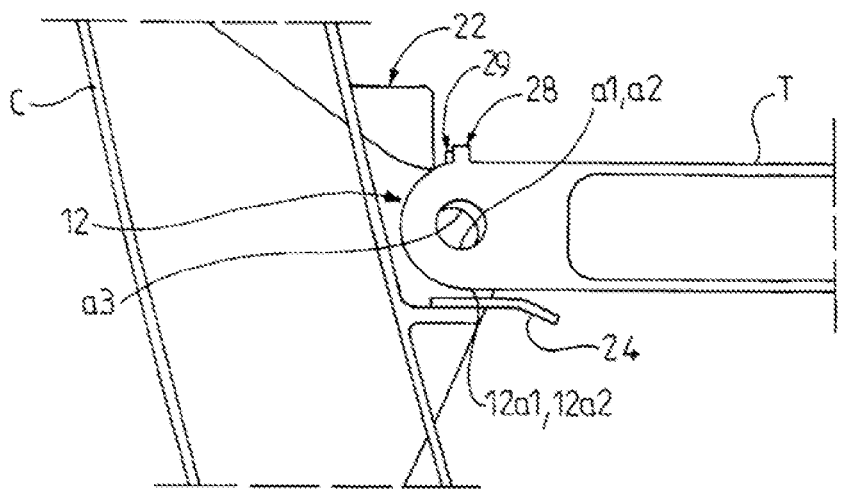
FIGS. 9 and 10 illustrate the positioning of the free end opposite the crossbeam of FIGS. 3 to 5 relative to the frame, along a second geometric axis Z, in accordance with one embodiment.
Figure 10:
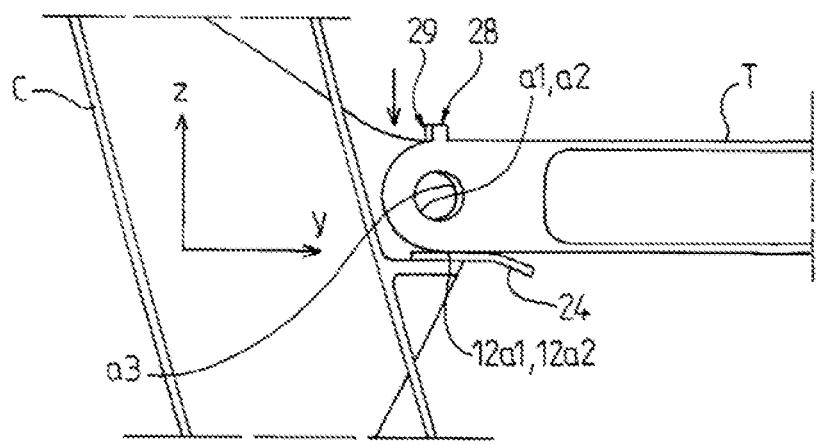

FIGS. 9 and 10 illustrate successively the positioning of the free end 12 relative to the engagement part 14 along the second geometric axis Z.

In the example described the free end 12 has already been positioned relative to the piece 14 along the first axis X.

The relative positioning error of the bores a1, a2 on the one hand and of the bore a3 on the other hand, along the two axes Z and Y, is evident in FIG. 9.

The crossbeam T continues its descent until the inner face 12a1, 12b1 of the arms of the clevis come into contact with the second positioning element 24 (chock), in particular with the branches of the U that form the chock. This second element 24 thus forms a stop along the second axis Z (FIG. 10).

In the position illustrated in FIG. 10, the bores a1, a2 and a3 have been positioned relative to one another along the second axis Z.

Only the positioning error along the third axis Y still remains.

It will be noted that the first positioning element 22 has, for example, been disassembled as soon as the free end 12 of the crossbeam has been lowered below the height of this element (FIGS. 9 and 10).

Figure 11:
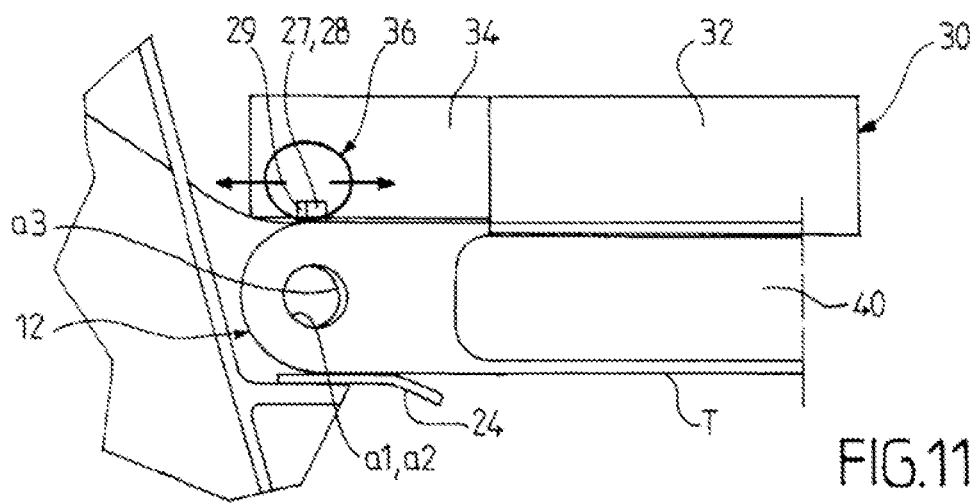
FIGS. 11 to 13 illustrate the positioning of the opposite free end of the crossbeam of FIGS. 3 to 5 relative to the frame, along a third geometric axis Y, in accordance with one embodiment.
Figure 12:
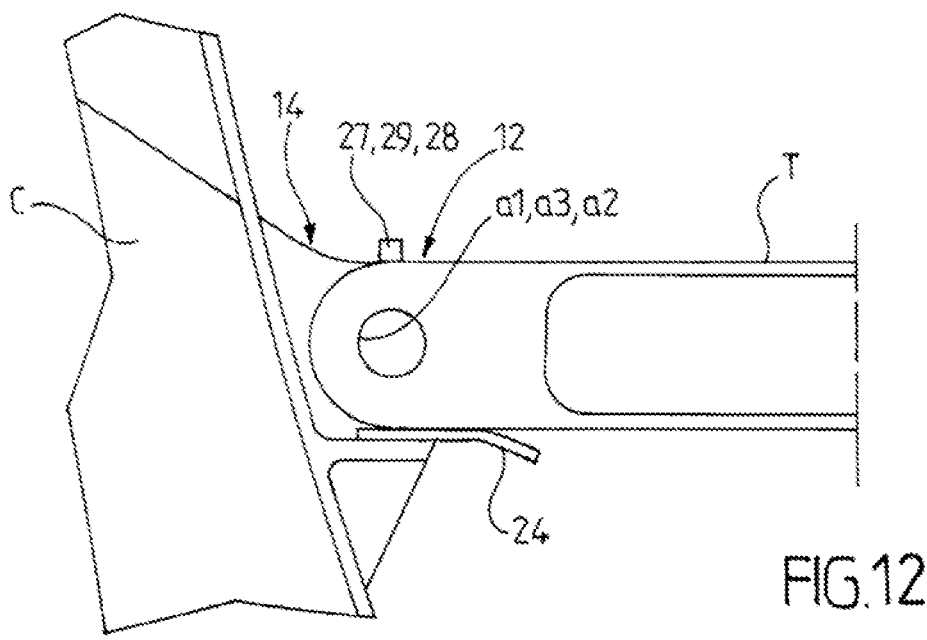
Figure 13:
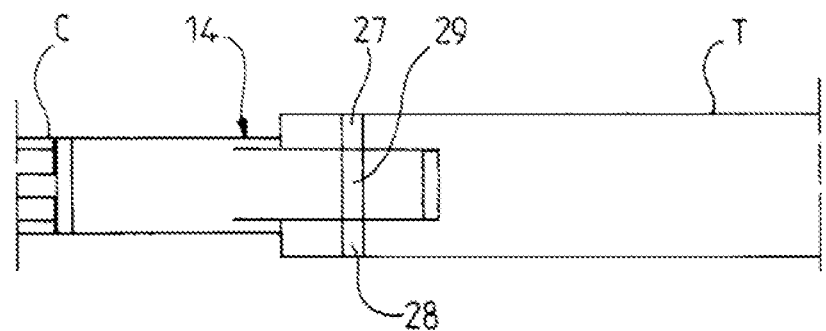

FIGS. 11 to 13 illustrate successively the positioning of the free end 12 relative to the engagement part along the third and last geometric axis Y (this axis corresponds to the longitudinal axis of the crossbeam).

This last positioning step is implemented by the tool 30 of FIG. 2, which is, for example, a clamp fastened to the crossbeam, for example to the two hollowed longitudinal flanks thereof. The body 32 of the tool is mounted in a manner locked on the upper longitudinal edges of the flanks, of which the flank denoted 40 is shown in FIG. 11.

The head 34 of the tool comprises gripping members 36, which are able to lock on the two lugs 27, 28 on the one hand and the lug 29 on the other hand, and which are able to move relative to one another in order to bring the lugs 27, 28 into alignment (along the axis X) with the lug 29.

In a manner not shown in the figures, the gripping members 36 comprise, on the one hand, a first gripping member or first gripping members, which is/are able to lock on the two lugs 27, 28 and, on the other hand, a second gripping member or second gripping members, which are able to lock on the lug 29. The first members are able to move relative to the second members (or vice versa) along the axis Y by means of drive means (motor, etc.) integrated in the tool, for example in the body 32 thereof, and controlled (by an external control on the tool or remotely) so as to drive a movement of the first members relative to the second members (or vice versa) along the axis Y.

In practice, the tool exerts a traction along the axis Y on the lug 29 so as to bring said lug into geometric correspondence with the lugs 27 and 28, thus providing a compression of the frame C illustrated in FIG. 3 (the frame has a certain flexibility in the plane thereof by its design and as a result of which it is able to withstand the forces caused by the pressurization of the aircraft cabin during flight).

The lugs 27, 28 are centered (by design) precisely over a vertical axis that passes via the center of each of the two first bores a1, a2.

The lug 29, for its part, is centered (by design) precisely over a vertical axis that passes via the center of the second bore a3.

Taking into account this arrangement, the alignment of the three lugs 27 to 29 ensures the positioning of the three bores relative to one another along the third axis Y.

FIGS. 12 and 13 illustrate respectively in side view and from above the final relative positioning of the bores along the three geometric axes X, Z and Y.

With such a positioning the bores are in geometric correspondence with one another in a given tolerance zone, for example within a few tenths of millimeters. A screw of the conical end type 42 (FIG. 14) is then inserted into the bores so as to improve the centering of said bores with one another.

This screw 42 is, for example, placed in position by a traction tool, which presses on the inner face of the hollow body of the screw.

A nut 44 is then mounted on the emerging end of the screw 42, which is opposite the head of said screw.

Once the assembly has been provided it is then no longer necessary to compress the frame C with the tool 30.

The positioning that has just been described is particularly effective and rapid. Because the pieces have been drilled beforehand to the definitive diameter thereof and therefore do not require any drilling operation in situ (in the aircraft structure during the course of integration or assembly), but merely a relative positioning of the pieces, this represents a not insignificant time saving. In addition, the fact of no longer performing drilling in situ makes it possible to prevent a generation of dust and of shavings in an environment in which pieces of equipment (for example; electronic equipment) sensitive to such pollution are sometimes already installed. In addition, this simplifies the drilling operations insofar as the tools and equipment necessary to perform said operations are often bulky and thus are difficult to integrate into the environment of the aircraft during the course of integration or assembly with an often increased density of equipment.

It will be noted that all the crossbeams of the structural part of the floor of the aircraft can be positioned and assembled on the respective frame thereof identically, either one after the other or simultaneously.

Figure 15:
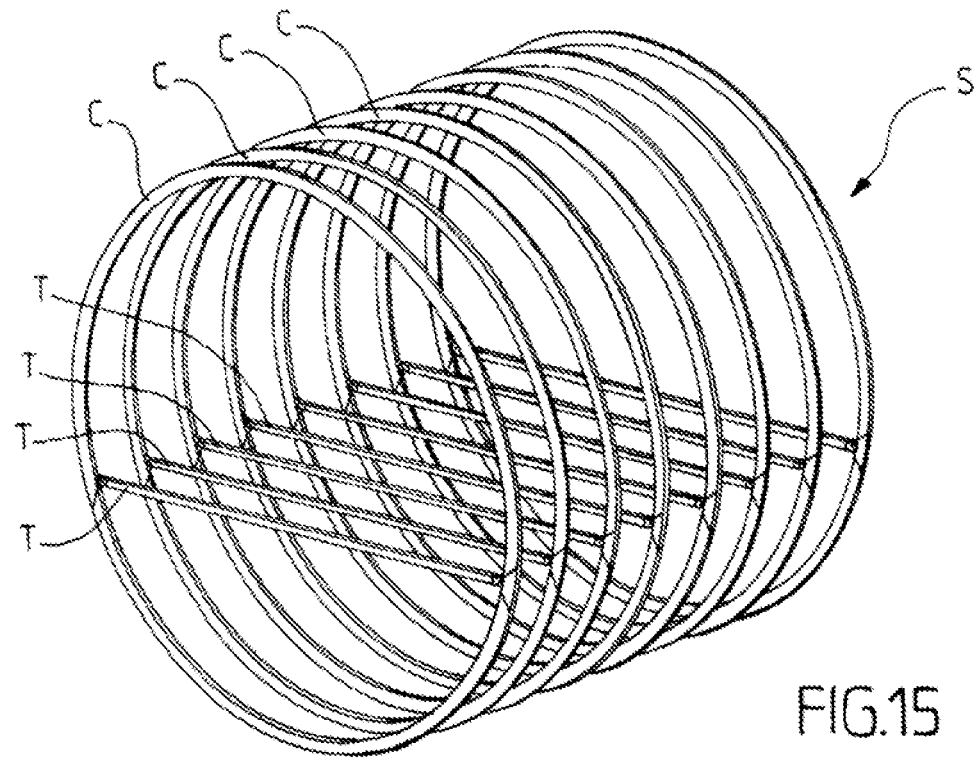
FIG. 15 is a perspective schematic view of a primary aircraft fuselage structure comprising crossbeams fixed to fuselage frames.
Figure 16:
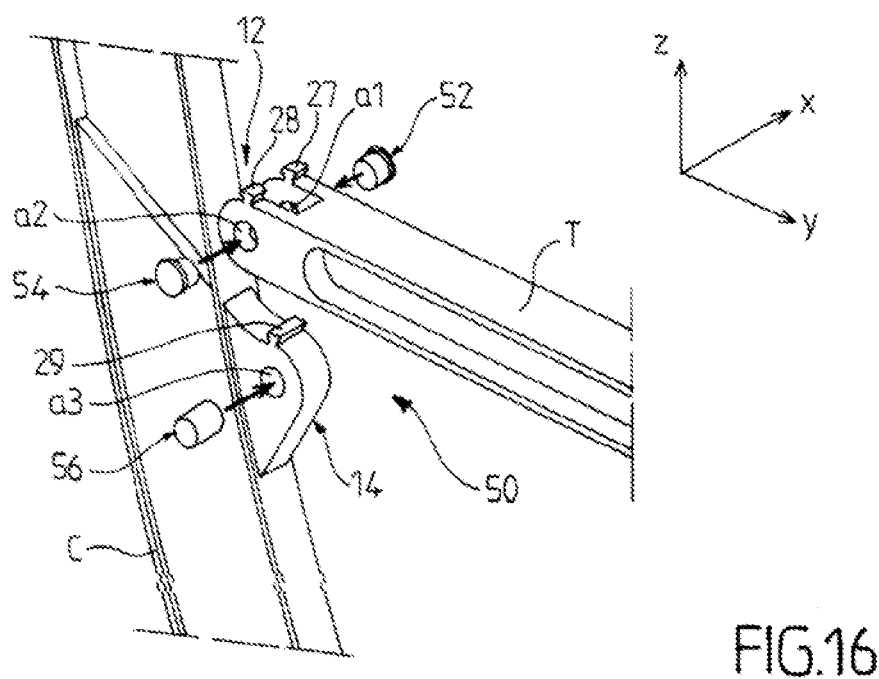
FIGS. 16 to 19 illustrate the positioning of the opposite free end of the crossbeam of FIGS. 3 to 5 relative to the frame, along the second z and third geometric axis y in accordance with another embodiment.

FIG. 15 schematically shows a primary aircraft fuselage structure denoted S comprising a number of frames C and a number of crossbeams T, which each extend between two diametrically opposed fixing points on the inner periphery of each frame. The crossbeams have been positioned and assembled as described above.

The positioning elements/means of the positioning device in accordance with the described embodiment are generally solely mechanical in nature and therefore do not comprise electronic, optical or other components, such as a camera.

These are mechanical elements/means that serve as geometric references to aid the relative positioning of two aircraft pieces (not necessarily those of the figures), but which are not involved in the functions of the pieces: the mechanical elements/means are additional elements/means relative to the pieces and are only there to serve as references during the relative displacement of the two pieces.

One and/or more of these elements/means is/are connected to one and/or the other of the pieces to be positioned, either permanently or temporarily.

One and/or more of these elements/means is/are for example fixed permanently to one and/or the other piece, for example by being formed integrally with a piece (for example: lugs 27, 28) or connected to this piece, but not removably.

Alternatively, one or more of these elements/means is/are fixed temporarily to one and/or the other piece, thus forming one or more connected and removable elements (for example: elements 22 and 24).

It will be noted that these mechanical positioning elements/means are arranged laterally or offset in relation to the bores: they therefore are arranged neither opposite nor within one and/or other of the bores.

The mechanical elements/means serving as geometric references do not require any additional mechanical structure in order to be held in position on the pieces to be positioned or to the side thereof. They therefore constitute a particularly easily implemented solution.

FIGS. 16 to 19 illustrate another embodiment of a device 50 for positioning the first piece (crossbeam) T relative to the second piece (frame) C.

This device 50 comprises the first positioning element 22 shown in FIGS. 1, 2 and 6 to 9, which is used in the same way (positioning along the first axis X).

The device 50 (FIG. 16) also comprises positioning means which comprise:
- two active members (also referred to as active targets) 52, 54 arranged on the crossbeam T,
- a passive member (also referred to a passive target) 56, which is arranged on the frame C and which is able to cooperate with the two active members 52, 54 by transmission and reception of electromagnetic waves.

Figure 17:
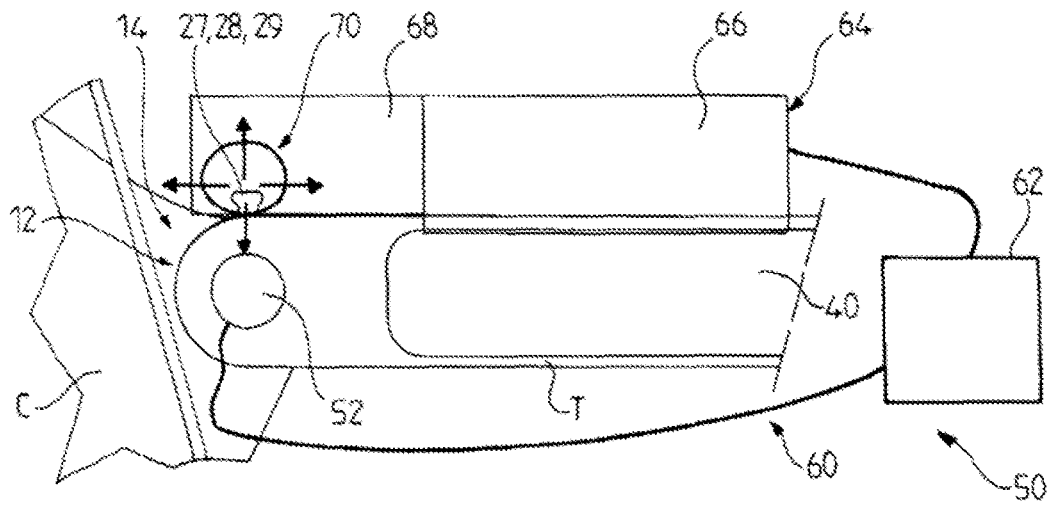

The active members 52, 54 are able to transmit electromagnetic waves and the passive member 56 is able to receive said waves. The members can be, for example, magnetic targets. As shown in FIG. 17, the device 50 also comprises a closed-loop control system 60. The system 60 is able to control, on the one hand, the electromagnetic waves transmitted by the active members 52, 54 and, on the other hand, depending on the waves received by the passive member 56, the relative displacement of the crossbeam in relation to the frame so as to bring the active and passive members into geometric correspondence. These members can also be considered as elements serving as geometric references (of a type other than the purely mechanical elements of FIGS. 1 to 15) present on the pieces or connected to the pieces (for example temporarily to be brought into geometric correspondence with one another.

The system 60 more particularly comprises a monitoring and control unit 62, which is connected to the active and passive members on the one hand and to a tool 64 on the other hand. The tool 62 can be integrated in the tool 64.

The tool 64 comprises a body 66 mounted in a manner locked on top and on the two drilled longitudinal flanks (for example: flank 40) of the crossbeam, similarly to the tool 30 of FIG. 11.

The tool 64 also comprises a head 68 fixed to a body 66 and which comprises gripping members 70 intended to be locked on the geometric references (for example: lugs) 27 to 29 of the crossbeam and of the frame. The gripping members 70 can be controlled remotely by the unit 62:
- in order to lock/unlock said gripping members on the geometric references;
- in order to displace said gripping members along the second (Z) and third axes (Y) as indicated by the arrows in FIG. 17 so as to displace the free end 12 of the crossbeam relative to the engagement part 14 of the frame.

All that mentioned above with regard to the tool 30 of FIG. 11 applies also here to the tool 64. Similarly to the tool 30, the tool 64 exerts an axial traction on the frame C (compression of the frame).

It will be noted that the active members 52, 54 are, for example, provided in the form of pellets inserted respectively into the bores a1 and a2 (FIG. 16) of the clevis 12. The same is true for the passive member 56 inserted into the bore 3a of the tenon 14.

The method in accordance with this other embodiment of positioning of the crossbeam with respect to the frame commences, as for the previous method, with a positioning along the first axis X by means of the first positioning element 22 (centering element).

Once this first positioning has been performed, the device 50 described above is implemented so as to align the lugs 27 to 29 (along the axis X) and therefore to place the bores a1, a2 on the one hand and a3 on the other hand in geometric correspondence along the axes Z and Y.

More particularly, the monitoring and control unit 62:
- controls the transmission of electromagnetic waves/signals by the active members 52, 54,
- receives information concerning the active members depending on the position of the passive member 56 with respect to the active members and, therefore, depending on the return of the signals emitted by the active members and reflected by the passive member— processes this information (and in particular deduces the difference between the respective positions of the active and passive elements depending on the received waves/signals), and transmits to the tool 64 a control suitable for provoking a displacement of the gripping members 70 corresponding to the difference between the positions thus determined (displacement of the gripping members locked on the part 14 with respect to the gripping members locked on the crossbeam),
- repeats the cycle of the previous steps until an alignment of the positions of the active and passive members is obtained that corresponds to a placement of the bores a1, a2 and a3 in geometric correspondence along the two axes Z and Y.

Figure 18:
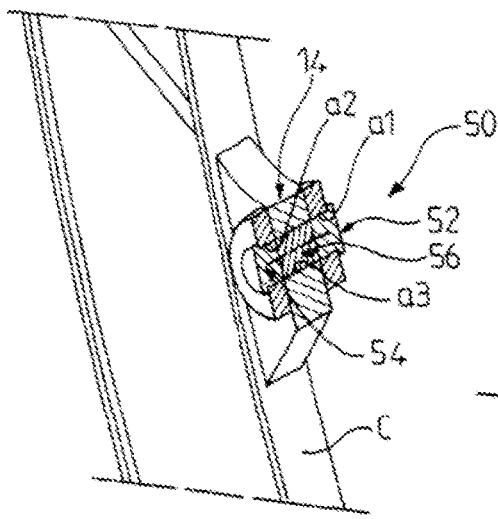

FIG. 18 is a sectional view showing the arrangement of the active members 52, 54 on either side of the passive member 56 when these members have been placed in the respective seats thereof (bores a1, a2, a3) and the positions thereof have been aligned along the three geometric axes.

Figure 19:
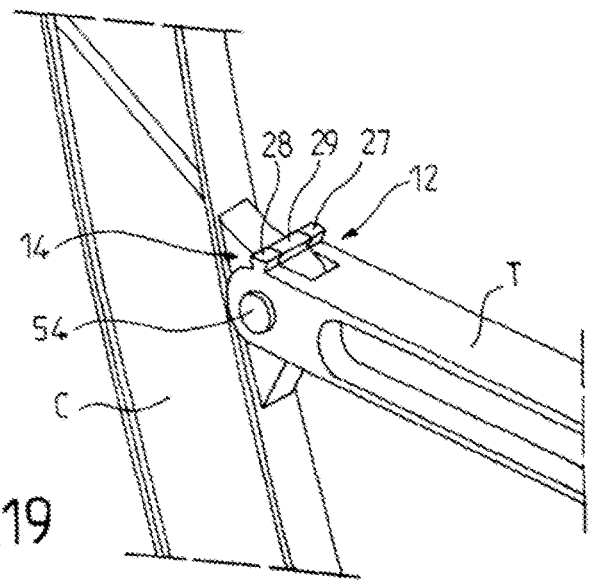

FIG. 19 illustrates the positioning of the two pieces along the three geometric axes.

Figure 14:
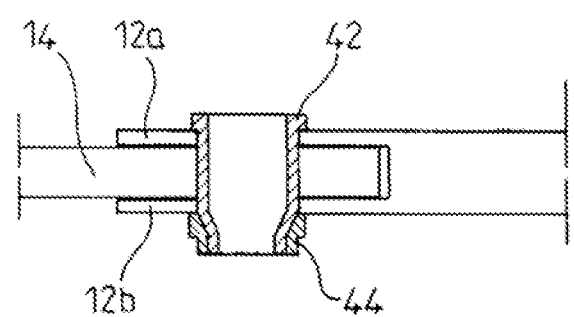
FIG. 14 is a schematic sectional view in a horizontal longitudinal plane of the opposite free end of the crossbeam assembled on the engagement part of the frame.

After placing the active and passive members in geometric correspondence, the active members 52, 54 are removed, whereas the passive member 56 is dispelled during the placement of the screw 42 of FIG. 14.

This passive member may form a sacrificial member, for example.

In this embodiment the mechanical element(s)/means serving as geometric references (with the exception of the members) have the same features as before. They are connected to the active and passive members, which in turn are arranged in the bores to be aligned. However, the active and passive members could be arranged at another location of the pieces. Whatever the arrangement of the members, these have proven to be easy to handle and place on the pieces, particularly when they are in the bores. They do not require any assistive mechanical structure in order to be held in position on the pieces. The advantages and features presented in relation with the first embodiment also apply here, provided they do not conflict with the presence of the members.

The embodiments described above firstly provide a positioning along the first axis X with the first positioning element 22, then a positioning along the two other axes Z and Y with the second positioning element 24 and the geometric references 27 to 29.

In accordance with a first variant (not shown), the positioning is performed along the first axis with the first element 22 and, during this positioning, the positioning along the two other axes is obtained simultaneously without the intervention either of the second element 24 or of the geometric references 27 to 29. The positioning device can thus be considerably simplified, since it is reduced to the first element 22.

It will be noted, however, that a second variant (not shown) can improve the first variant by adjusting the geometric references on the two pieces (such as lugs 27 to 29) so as to check the good positioning of the pieces.

In accordance with a third variant (not shown), the relative positioning of the pieces can only be performed along the second (Z) and third axes (Y) by passing from the first positioning element 22. In this case the crossbeam is directly mounted via its clevis on the tenon of the frame.

In accordance with a fourth variant (not shown), the embodiment illustrated in FIGS. 16 to 19 can be simplified by omitting the first positioning element 22, as is the case for the third variant.

In accordance with a fifth variant (not shown), the number of active and passive members, the placement thereof and the form thereof can vary. These elements can also be connected on the pieces after construction thereof, removably or irremovably, or can even be integrated in said pieces during construction thereof.

In accordance with a sixth variant (not shown), other elements or shapes formed in relief on one and/or the other piece (crossbeam, frame) can be considered in order to place one of the pieces in geometric reference with respect to the other piece.

In accordance with a seventh variant (not shown), the form, the placement and the number of elements 22, 24 and 27 to 29 may vary whilst each ensuring the same function(s). The elements or some of said elements may or may not be removable.

In accordance with an eighth variant (not shown), the placements of the clevis 12 and of the tenon 14 can be reversed: the clevis is integral with the frame and the tenon is integral with the crossbeam.

In accordance with a ninth variant (not shown), the clevis and the tenon can be replaced by other complementary engagement or interlocking means making it possible to ensure the assembly of a crossbeam on a frame.

In accordance with a tenth variant (not shown), a tool is used to bring the geometric references present on the two pieces to be positioned into geometric correspondence along one or more geometric axes, said geometric references being different from the references identified in the figures described above.

In accordance with an eleventh variant (not shown), the active and passive members of the embodiment of FIGS. 16 to 19 can be used in combination with one and/or a plurality of other mechanical positioning elements, which are not necessarily the chock 22 or the lugs 27 to 29.

It will be noted that the two pieces to be positioned with respect to one another can be other pieces of an aircraft, and that which has been said above in particular, in terms of features, functions and advantages, applies also to the positioning of other aircraft pieces. One and/or the other of these pieces can be mobile during at least part of the duration of implementation of the method for positioning one piece with respect to the other.

Generally, one and/or the other of the aforementioned embodiments and variants apply to the positioning of other aircraft pieces, either by having recourse to one element or the elements serving as purely mechanical geometric references or by combining one such element or such elements with active and passive members (in addition), as mentioned above in the embodiment of FIGS. 16 to 19 and/or in the variants thereof. The form, the number and the placement of the element(s) serving as geometric references and of the active and passive members relative to the pieces to be positioned and to be assembled can vary with respect to that which has been said above.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly comprising:
a first aircraft piece,
a second aircraft piece,
a device for positioning the first piece relative to the second piece,
the first piece comprising a free end provided with at least one first bore that is pre-drilled to a predetermined and definitive diameter, and
the second piece comprising an engagement part provided with at least one second bore intended to come into correspondence with said at least one first bore, said at least one second bore is pre-drilled to a predetermined and definitive diameter,
the device comprising at least one mechanical positioning element serving as a geometric reference in the event of a relative displacement of said at least one first and second bores to position said at least one first bore relative to said at least one second bore along at least one of a first, a second and a third geometric axis, wherein the first geometric axis is parallel to an axis of said at least first and second bores,
wherein the at least one positioning element comprises an element for centering the first piece relative to the second piece along the first axis;
wherein the centering element is arranged vertically offset in relation to the second bore and laterally aligned with the second bore;
wherein the centering element is a shoe, wherein an upper portion of the shoe forms a wedge in the vertical direction, wherein the shoe extends in the vertical direction with the upper portion of the shoe forming the wedge and an enlarged lower portion.

2. The assembly according to claim 1, wherein said at least one positioning element is connected to one of the first and second pieces.

3. The assembly according to claim 1, wherein said at least one positioning element is not arranged inside said at least one first and second bores.

4. The assembly according to claim 1, wherein the centering element is arranged above the engagement part of the second piece.

5. The assembly according to claim 1, wherein the centering element is arranged below the engagement part of the second piece.

6. The assembly according to claim 1, wherein said assembly comprises a tool for positioning the first piece relative to the second piece.

7. The assembly according to claim 6, wherein the positioning tool comprises first gripping members, which are able to be locked on one of the pieces, and second gripping members, which are able to be locked on the other piece, said first gripping members being displaceable relative to said second gripping members along said at least one geometric axis.

8. The assembly according to claim 7, wherein the tool comprises a head provided with the first and second gripping members, the tool being configured to drive a movement of said first gripping members relative to said second gripping members along said at least one geometric axis.

9. The assembly according to claim 1, wherein said at least one positioning element comprises a plurality of elements serving as geometric references arranged on the first piece and on the second piece and which are configured to be aligned with one another along at least one of the second geometric axis and the third geometric axis.

10. The assembly according to claim 1, wherein said at least one positioning element comprises a plurality of elements serving as geometric references arranged on the first piece and on the second piece and which are configured to be aligned with one another along at least one of the second geometric axis and the third geometric axis and wherein at least one tool is able to bring the geometric reference or references of one piece in alignment with the geometric reference or references of the other piece along at least one of the second geometric axis and the third geometric axis.

11. The assembly according to claim 1, wherein the first and the third geometric axis are arranged in a horizontal plane, and the second geometric axis is a vertical axis.

12. The assembly according to claim 1, wherein the first piece is a crossbeam and the second piece is a frame.

13. The assembly according to claim 12, wherein the crossbeam is configured to be fixed at two diametrically opposed points of the inner periphery of the frame by means of the two opposite ends of said crossbeam, of which one is the free, as yet unfixed end of the crossbeam and the other is the opposite end already fixed at a point of the frame.

14. The assembly according to claim 13, further comprising a tool configured to compress the frame and which is able to exert a compressive force on the frame so as to bring toward one another the two diametrically opposed points of the inner periphery of the frame.

15. The assembly according to claim 12, wherein the free end of the crossbeam comprises a clevis aligned in the longitudinal axis of the crossbeam, and the engagement part forms a tenon arranged on the inner periphery of the frame.

16. An assembly comprising:
a first aircraft piece,
a second aircraft piece,
a device for positioning the first piece relative to the second piece,
the first piece comprising a free end provided with at least one first bore that is pre-drilled to a predetermined and definitive diameter, and
the second piece comprising an engagement part provided with at least one second bore intended to come into correspondence with said at least one first bore, said at least one second bore is pre-drilled to a predetermined and definitive diameter,
the device comprising at least one mechanical positioning element serving as a geometric reference in the event of a relative displacement of said at least one first and second bores to position said at least one first bore relative to said at least one second bore along at least one of a first, a second and a third geometric axis, wherein the mechanical positioning element is a shoe, wherein an upper portion of the shoe forms a wedge in the vertical direction, wherein the shoe extends in the vertical direction with the upper portion of the shoe forming the wedge and an enlarged lower portion;
at least one active member arranged on one piece,
at least one passive member arranged on the other piece and which is able to cooperate with said at least one active member by transmission and reception of electromagnetic waves, wherein said at least one active member and said at least one passive member are located in said at least one first bore and said at least one second bore,
a closed-loop control system configured to control the electromagnetic waves transmitted and the displacement of at least one piece relative to the other depending on the waves received by said at least one passive member so as to bring said at least one active and passive member into geometric correspondence.

17. The assembly according to claim 16, wherein the positioning device comprises a plurality of elements serving as geometric references arranged on the first piece and on the second piece and which are configured to be aligned with one another along at least one of the first geometric axis, the second geometric axis and the third geometric axis.

18. An aircraft comprising at least one assembly comprising:
a first aircraft piece,
a second aircraft piece,
a device for positioning the first piece relative to the second piece,
the first piece comprising a free end provided with at least one first bore that is pre-drilled to a predetermined and definitive diameter, and
the second piece comprising an engagement part provided with at least one second bore intended to come into correspondence with said at least one first bore, said at least one second bore is pre-drilled to a predetermined and definitive diameter,
the device comprising at least one mechanical positioning element serving as a geometric reference in the event of a relative displacement of said at least one first and second bores to position said at least one first bore relative to said at least one second bore along at least one of a first, a second and a third geometric axis, wherein the first geometric axis is parallel to an axis of said at least first and second bores,
wherein the at least one positioning element comprises an element for centering the first piece relative to the second piece along the first axis;
wherein the centering element is arranged vertically offset in relation to the second bore and laterally aligned with the second bore;
wherein the centering element is a shoe, wherein an upper portion of the shoe forms a wedge in the vertical direction, wherein the shoe extends in the vertical direction with the upper portion of the shoe forming the wedge and an enlarged lower portion.

19. A method for positioning a first aircraft piece relative to a second aircraft piece, the first piece comprising a free end provided with at least one first bore and the second piece comprising an engagement part provided with at least one second bore intended to come into correspondence with said at least one first bore, comprising the steps:
drilling said at least one first bore and said at least one second bore prior to a relative positioning of the first aircraft piece and the second aircraft piece,
relatively displacing said at least one first and second bores along at least one of three geometric axes, wherein a first geometric axis is parallel to an axis of said at least first and second bores, and positioning said at least one first bore relative to said at least one second bore by means of at least one mechanical positioning element, which serves as a geometric reference between said at least one first and second bores, wherein the at least one positioning element comprises an element for centering the first piece relative to the second piece along the first axis;

wherein the centering element is arranged vertically offset in relation to the second bore and laterally aligned with the second bore;

wherein the centering element is a shoe, wherein an upper portion of the shoe forms a wedge in the vertical direction, wherein the shoe extends in the vertical direction with the upper portion of the shoe forming the wedge and an enlarged lower portion.

* * * * *